United States Patent

[11] 3,558,889

[72] Inventors Kern K.N. Chang;
Shing-Gong Liu, Princeton, N.J.

[21] Appl. No. 591,470
[22] Filed Nov. 2, 1966
[45] Patented Jan. 26, 1971
[73] Assignee RCA Corporation
a corporation of Delaware

[54] BULK SEMICONDUCTOR LIGHT RADIATING DEVICE
5 Claims, 1 Drawing Fig.

[52] U.S. Cl. .......... 250/88, 250/211, 217; 331/94.5
[51] Int. Cl. .......... H05b 33/00
[50] Field of Search .......... 250/211, 217SLS, 88, 211, 213A; 313/108D; 315/326; 331/94.5; 317/235—27

[56] References Cited

UNITED STATES PATENTS

| | | | |
|---|---|---|---|
| 3,267,317 | 8/1966 | Fischer | 331/94.5X |
| 3,353,114 | 11/1967 | Hanks et al. | 331/94.5 |
| 3,412,344 | 11/1968 | Pankove | 331/94.5 |
| 3,111,587 | 11/1963 | Rocard | 317/235X |
| 3,283,207 | 11/1966 | Klein | 250/217X |
| 3,312,910 | 4/1967 | Offner | 313/108X |

OTHER REFERENCES

" Solid State Physical Electronics" By Van Der Ziel, Prentice Hall Inc.; 1957, pp 241— 246; QC 721 v 34 (copy in Div. 256)

*Primary Examiner*—Walter Stolwein
*Attorney*—Edward J. Norton

ABSTRACT: A light-radiating element, capable of emitting light pulses over a narrow frequency bandwidth, having a duration in the order of $10^{-9}$ to $10^{-7}$ seconds, is obtained from a given bulk semiconductor material of a single type conductivity, such as N-type GaAs, having ohmic electrodes in response to the application thereto through these ohmic electrodes of an electric field of a magnitude exceeding a given threshold. The pattern of radiation is almost constant over 180° in both horizontal and vertical directions.

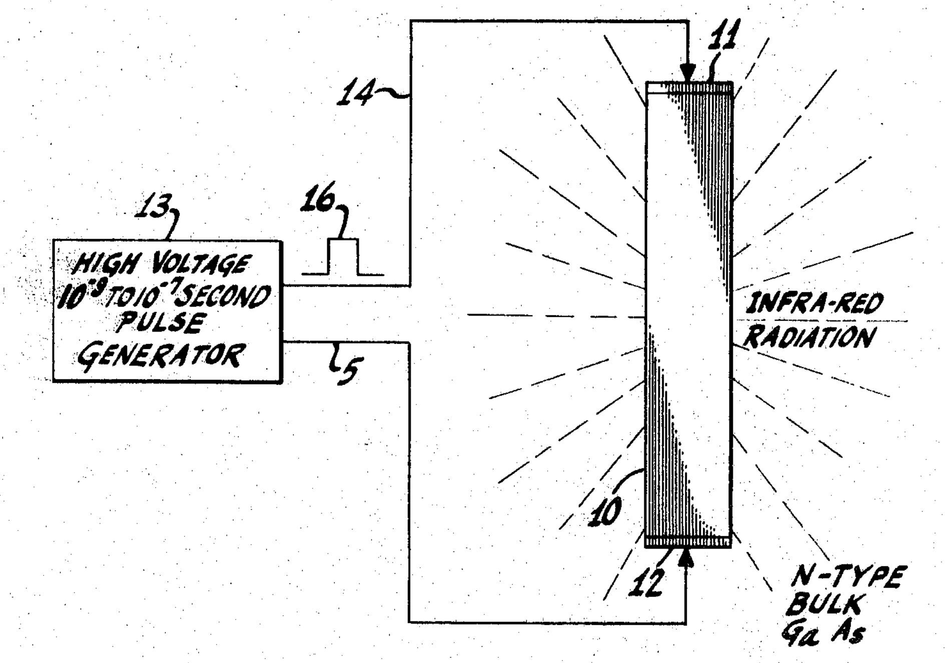
Inventors:
SHING-GONG LIU &
KERN K. N. CHANG
BY Edward J. Norton
Attorney

BULK SEMICONDUCTOR LIGHT RADIATING DEVICE

This invention relates to a bulk semiconductor light-radiating device and, more particularly, to such a device characterized by the fact that the application thereto of an electric field of a magnitude exceeding a given threshold results in the emission therefrom of light of a narrow frequency bandwidth.

The term "light" as used herein includes infrared and ultraviolet light, as well as visible light.

It is old in the art to produce light from semiconductor material in the form of a photodiode or a P-N junction injection laser diode. It is also old in the art to produce radiation at microwave frequencies, known as the Gunn effect, from bulk semiconductor material. However, the present invention of a device capable of radiating light from a bulk semiconductor material, possesses certain desirable features absent in the prior art.

More particularly, light-radiating semiconductor diodes, when pulsed, have relatively long rise times and recovery or fall times. In contrast, it has been found that a light-radiating element composed of a bulk semiconductor material, in accordance with the present invention, can be made to have an extremely short rise time and recovery or fall time. Specifically, it has been found that such a light-radiating element, in response to the application thereto of a short duration high intensity electric field, is capable of emitting a light pulse having a duration in the order of $10^{-7}$ seconds and having a peak power in the order of tens of watts. For instance, in the case wherein the semiconductor material was gallium arsenide (GaAs) of N-type conductivity having a resistivity in the range between 0.01 ohm-cm. and 0.1 ohm-cm. and a mobility of the order of 5,000 cm.2/volt-sec., the radiation obtained is centered at about 9,000 A and has a bandwidth of about 150 A.

A bulk semiconductor light-radiating device, in accordance with the present invention, would be particularly useful for the purpose of obtaining secure communication. In particular, the large peak power and fast pulse fall and rise times makes possible a pulse-code-modulated communication system of high channel capacity.

Another important use of the present invention would be in surveillance and mapping radar. The fat pulse rise and fall times makes possible the use of very short pulses at high repetition rates.

In the case where the bulk semiconductor is GaAs, the fact that the radiation is in a narrow band centered at 9,000 A in the infrared region of the spectrum, makes such an infrared emitting device useful on aircraft for distinguishing clear air from turbulent air. This is because emitted radiation at 9,000 A sits on the lower edge of an atmospheric absorptive band. Changes in the atmosphere due to turbulence would produce detectable changes in radar echo returns from infrared light pulses emitted from a bulk GaAs infrared-radiating device in a turbulent area.

It is therefore an object of the present invention to provide a light-radiating element composed of a bulk semiconductor material.

It is a further object of the present invention to provide such an element capable of emitting high power, very short, pulses of light having fast rise and fall times.

These and other objects, features and advantages of the present invention will become more apparent from the following detailed description taken together with the accompanying drawing in which the sole figure shows a referred embodiment of the present invention.

Referring to the drawing, there is shown a longitudinal light emitting element 10 composed of N-type bulk GaAs. Typical examples of light-emitting element 10 are bulk GaAs doped with selenium or tin sufficient to give light-emitting element 10 a resistivity between 0.01 and 0.1 ohm-cm., and a mobility of the order of 5,000 cm.2/volt-sec. The term "mobility" is defined as the average drift velocity of carriers per unit electric field. However, it has been found that high resistivity GaAs, having a resistivity of between 0.5 and 8 ohm-cm. will also emit some light in response to an electric field applied thereacross. However the amount of radiation which can be obtained from this high resistivity material is considerably smaller than that of the low resistivity 0.01—0.1 ohm-cm. material.

The light-emitting element 10 has typical physical dimensions of 0.3 cm. length, 0.1 cm. width and 0.025 cm. depth.

Connected to each respective one of the opposite ends of light-emitting element 10 are ohmic electrodes 11 and 12, respectively. Further shown in the drawing is pulse generator 13 having output conductors 14 and 15, respectively. Pulse generator 13 produces high voltage pulses each having a duration in the order of $10^{-9}$ to $10^{-7}$ seconds. Output conductors 14 and 15, as shown, are connected respectively to ohmic electrodes 11 and 12 of light-emitting element 10. The high voltage pulse output of generator 13, shown schematically as pulse 16, is effective in applying a high intensity electric field through light-emitting element 10. More particularly, the intensity of this electric field exceeds a threshold value ranging from 1200 to 2700 volts per cm., depending upon the exact resistivity of the N-type bulk GaAs of which light-emitting element 10 is composed.

It has been found that a small relatively insignificant amount of radiation will take place from light-emitting element 10 even when the intensity of the electric field applied therethrough is below the aforesaid threshold value. However, when the field strength exceeds the threshold value, the intensity of radiation increases sharply to a very significant amount. In fact, the radiated power shows no saturation with field strength up to a field strength sufficient to burn out light-emitting element 10. Also, the infrared radiation from light-emitting element 10 is time coherent with voltage pulse 16, i.e., it has a fast rise and fall time which is isochronous with the leading and lagging edges of pulse 16. It has been found that peak powers of tens of watts may be obtained, and that the pattern of infrared radiation from light-emitting element 10 is almost constant over 180° in both horizontal and vertical directions.

Although only a preferred embodiment of the invention has been described in detail herein, it is not intended that the invention be restricted hereto, but that it be limited by the true spirit and scope of the appended claims.

I claim:

1. In combination, a light radiating element composed of bulk GaAs semiconductor material of N-type conductivity having ohmic electrodes, said semiconductor material being characterized by having a resistivity in the range between 0.01 ohm-cm. and 0.1 ohm-cm. and a carrier mobility in the order of 5000 cm. 2/volt-sec. and further being characterized by the fact that the application thereto through said ohmic electrodes of an electric field of a magnitude exceeding a given threshold results in the emission therefrom of light over a narrow frequency bandwidth, and means including said ohmic electrodes for at least intermittently applying said electric field to said light radiating element.

2. The combination defined in claim 1, wherein said given threshold is in the range between 1200 to 2700 volts/cm.

3. The combination defined in claim 1, wherein said narrow frequency bandwidth is centered at about 9,000 A and has a bandwidth of about 150 A.

4. The combination defined in claim 1, wherein said means for applying said field is a pulse generator for applying at least one DC pulse to said element.

5. The combination defined in claim 4, wherein the duration of said pulse is in the order of $10^{-9}$ to $10^{-7}$ seconds.